US012764136B1

(12) United States Patent
Dorfman et al.

(10) Patent No.: US 12,764,136 B1
(45) Date of Patent: Oct. 13, 2026

(54) TECHNIQUES FOR AGENTLESS ENDPOINT DETECTION AND RESPONSE FOR APPLIANCES

(71) Applicant: Wiz, Inc., New York, NY (US)

(72) Inventors: Shahar Dorfman, Herzliya (IL); Amitai Cohen, Kfar Saba (IL); Ofir Brukner, Tenafly, NJ (US); Ofir Saban, Netanya (IL); Ron Konigsberg, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/389,914

(22) Filed: Nov. 14, 2025

(51) Int. Cl.
*G06F 21/00* (2013.01)
*H04L 9/40* (2022.01)
*H04L 67/10* (2022.01)

(52) U.S. Cl.
CPC ...... *H04L 63/1416* (2013.01); *H04L 63/1425* (2013.01); *H04L 67/10* (2013.01)

(58) Field of Classification Search
CPC .. H04L 63/1416; H04L 63/1425; H04L 67/10
See application file for complete search history.

(56) References Cited

U.S. PATENT DOCUMENTS 9,773,112 B1 * 9/2017 Rathor .................. G06F 21/554
12,166,777 B2 12/2024 Frey et al.
12,309,186 B2 5/2025 Jenks et al.
12,464,011 B1 * 11/2025 Lidgi .................. H04L 63/1441
2008/0250500 A1 * 10/2008 Olson ................. H04L 63/1416 726/22
2014/0215616 A1 * 7/2014 Bhatt .................. H04L 63/1441 726/23
2022/0086173 A1 3/2022 Yavo et al.
2023/0300112 A1 * 9/2023 Wood .................. H04L 63/1416 726/22
2024/0244065 A1 * 7/2024 Shemesh ............. G06F 21/6218
2024/0330456 A1 * 10/2024 Gabay ..................... G06F 21/54

* cited by examiner

*Primary Examiner* — William A Corum, Jr.
(74) *Attorney, Agent, or Firm* — M&B IP Analysts, LLC

(57) ABSTRACT

A method and system for agentless endpoint detection and response for software appliances deployed in a cloud computing environment is presented. The method includes detecting a software appliance deployed in a cloud computing environment, the software appliance including an application stored on a disk of the software appliance; generating an inspectable disk based on the disk, wherein the disk stores a log of events for the application; inspecting the log of events stored on the inspectable disk to detect a first event indicating a cybersecurity issue; inspecting a network log of the cloud computing environment to detect a second event in the cloud computing environment; determining a cybersecurity threat based on detecting the first event and the second event; and initiating a mitigation action in response to the detection of the cybersecurity threat.

17 Claims, 3 Drawing Sheets

TECHNIQUES FOR AGENTLESS ENDPOINT DETECTION AND RESPONSE FOR APPLIANCES

TECHNICAL FIELD

The present disclosure relates generally to the field of cybersecurity threat detection and specifically to the detection of cybersecurity threats for software appliances deployed in the cloud computing environment.

BACKGROUND

The landscape of cybersecurity is constantly evolving, with cyber attackers employing increasingly sophisticated methods to breach systems, exfiltrate sensitive data, and disrupt business operations. As a result, detecting and responding to cybersecurity threats has become one of the most critical tasks for security professionals worldwide.

Agentless Endpoint Detection and Response (EDR) monitors and analyzes cybersecurity activities on endpoint systems without installing a software agent. Agentless Endpoint Detection and Response gathers data through network traffic, logs, cloud service Application Programming Interface (APIs) and provides visibility of resource activity across the cloud computing environment. This method is especially useful in environments where deploying agents is difficult or impractical such as cloud workloads.

Some of the benefits of Agentless EDR include easier and faster deployment, low impact on endpoints, better coverage for unmanaged devices, improved visibility across environments, etc. Some challenges in the field of Agentless EDR include limited visibility of low-level activity, real-time response limitations, dependency on external data sources, difficult offline monitoring, etc.

Thus, it would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a software appliance deployed in a cloud computing environment, the software appliance including an application stored on a disk of the software appliance. The method may also include generating an inspectable disk based on the disk, where the disk stores a log of events for the application. The method may furthermore include inspecting the log of events stored on the inspectable disk to detect a first event indicating a cybersecurity issue; inspecting a network log of the cloud computing environment to detect a second event in the cloud computing environment; determining a cybersecurity threat based on detecting the first event and the second event; and initiating a mitigation action in response to the detection of the cybersecurity threat. Other embodiments of this aspect include corresponding computer systems, apparatus, and computer programs recorded on one or more computer storage devices, each configured to perform the actions of the methods.

Implementations may include one or more of the following features. The method where detecting a software appliance deployed in a cloud computing environment may include: inspecting event records stored in the network log to detect the software appliance. The method where detecting a software appliance deployed in the cloud computing environment further may include: filtering the event records stored in the network log to detect an identifier of a software appliance. The method where generating an inspectable disk based on the disk, further may include: generating the inspectable disk based on a clone of the disk of the software appliance. The method where generating an inspectable disk based on the disk, further may include: generating the inspectable disk based on a snapshot of the disk. The method where inspecting the log of events stored on the inspectable disk further may include: inspecting data fields of event records to detect the first event, where the first event is of a first type. The method may include: inspecting the inspectable disk for a cybersecurity object, where the cybersecurity object indicates the cybersecurity issue. The method where inspecting a network log further may include: inspecting data fields of event records stored in the network log for detection of the second event. The method where initiating a mitigation action further may include: initiating the mitigation action on the software appliance. Implementations of the described techniques may include hardware, a method or process, or a computer tangible medium.

In one general aspect, a non-transitory computer-readable medium may include one or more instructions that, when executed by one or more processors of a device, cause the device to: detect a software appliance deployed in a cloud computing environment, the software appliance including an application stored on a disk of the software appliance. The medium may furthermore include generate an inspectable disk based on the disk, where the disk stores a log of events for the application. The medium may in addition include inspect the log of events stored on the inspectable disk to detect a first event indicating a cybersecurity issue. The medium may moreover include inspect a network log of the cloud computing environment to detect a second event in the cloud computing environment. The medium may also include determine a cybersecurity threat based on detecting the first event and the second event. The medium may furthermore include initiate a mitigation action in response to the detection of the cybersecurity threat. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a software appliance deployed in a cloud computing environment, the software appliance including an application stored on a disk of the software appliance. The system may in addition generate an inspectable disk based on the disk, where the disk stores a log of events for the application. The system may moreover inspect the log of events stored on the inspectable disk to detect a first event indicating a cybersecurity issue. The system may also inspect a network log of the cloud computing environment to detect a second event in the cloud computing environment. The system may furthermore determine a cybersecurity threat based on detecting the first event and the second event. The system may in addition initiate a mitigation action in response to the detection of the cybersecurity threat. Other embodiments of this aspect include corresponding computer systems, apparatus, and computer programs recorded on one or more computer storage devices, each configured to perform the actions of the methods.

Implementations may include one or more of the following features. The system where the memory contains further instructions that, when executed by the processing circuitry for detecting a software appliance deployed in a cloud computing environment, further configure the system to: inspect event records stored in the network log to detect the software appliance. The system where the memory contains further instructions that, when executed by the processing circuitry for detecting a software appliance deployed in the cloud computing environment, further configure the system to: filter the event records stored in the network log to detect an identifier of a software appliance. The system where the memory contains further instructions that, when executed by the processing circuitry for generating an inspectable disk based on the disk, further configure the system to: generate the inspectable disk based on a clone of the disk of the software appliance. The system where the memory contains further instructions that, when executed by the processing circuitry for generating an inspectable disk based on the disk, further configure the system to: generate the inspectable disk based on a snapshot of the disk. The system where the memory contains further instructions that, when executed by the processing circuitry for inspecting the log of events stored on the inspectable disk, further configure the system to: inspect data fields of event records to detect the first event, where the first event is of a first type. The system where the memory contains further instructions which when executed by the processing circuitry further configure the system to: inspect the inspectable disk for a cybersecurity object, where the cybersecurity object indicates the cybersecurity issue. The system where the memory contains further instructions that, when executed by the processing circuitry for inspecting a network log, further configure the system to: inspect data fields of event records stored in the network log for detection of the second event. The system where the memory contains further instructions that, when executed by the processing circuitry for initiating a mitigation action, further configure the system to: initiate the mitigation action on the software appliance. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
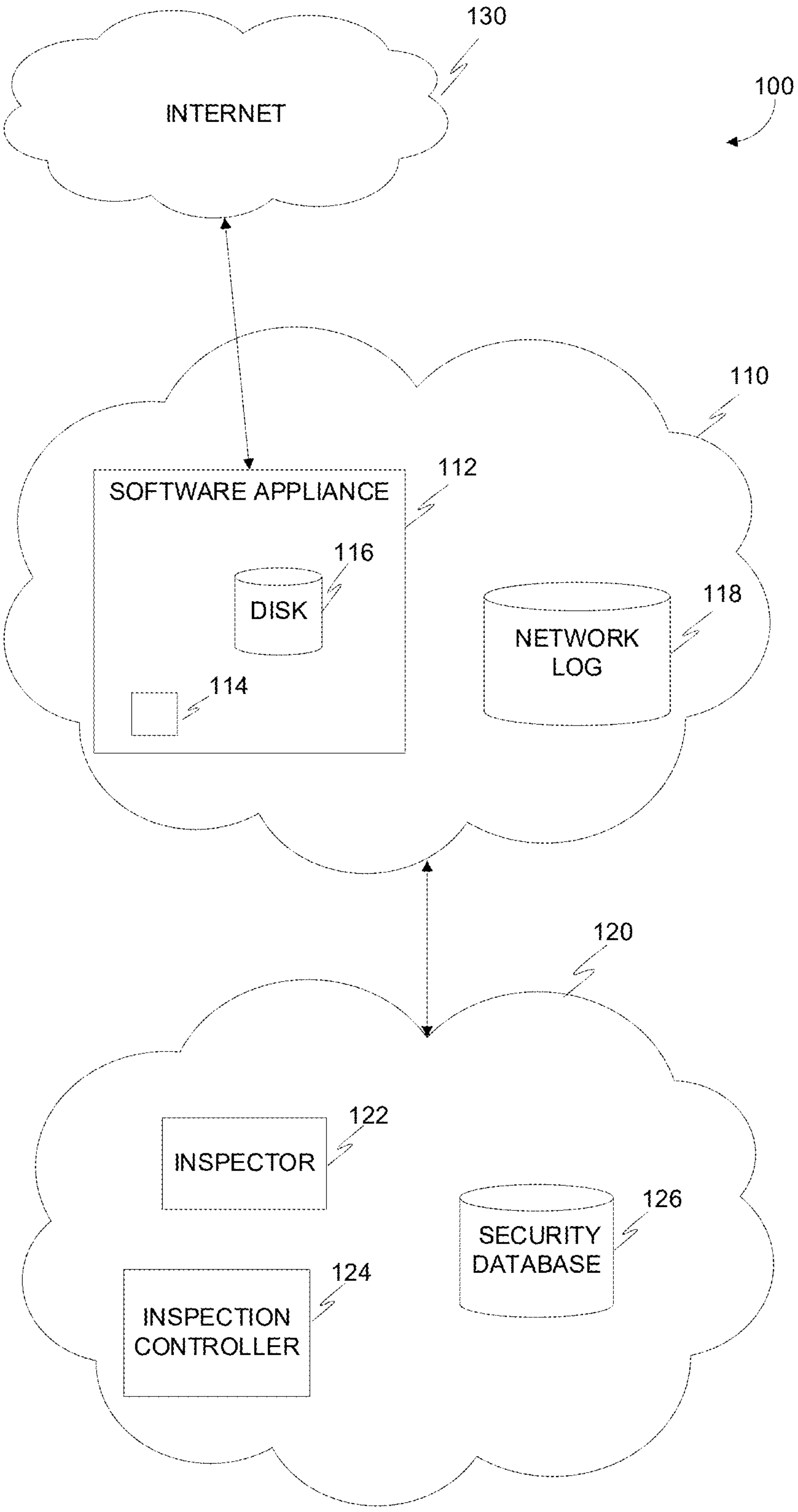
FIG. 1 is an example of a cloud computing environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for agentless endpoint detection and response for software appliances deployed in the cloud computing environment. The disclosed embodiments provide techniques for agentless endpoint detection and response based on determining cybersecurity threats based on detecting software appliances deployed in the cloud computing environment and inspecting logs of events to detect events indicating a cybersecurity issue.

FIG. 1 is an example schematic diagram 100 of a cloud computing environment, implemented in accordance with an embodiment. In an embodiment, the cloud computing environment 110 includes a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

In various embodiments, the cloud computing environment 110 includes cloud entities deployed as components of the cloud computing environment 110. In an embodiment, the cloud entity is a principal, a resource, a combination thereof, and the like. In an embodiment, the resource is a cloud entity which provides access to a compute resource, such as a processor, a memory, a storage, and the like.

In some embodiments, the resource is a virtual machine, a software container, a serverless function, and the like. In an embodiment, the resource is a software application, such as a webserver, a gateway, a load balancer, a web application firewall (WAF), an appliance, and the like.

In an embodiment, the resource is a software appliance 112. In some embodiments, the software appliance 112 is a pre-configured self-contained software environment. In an embodiment the software appliance 112 includes an operating system, a software application 114, a disk 116, a combination thereof, and the like. In an embodiment, the software appliance 112 includes the necessary dependencies, libraries, and configurations required for the software application 114 to run on the operating system. In certain embodiments, the software appliance 112 is configured to be deployed on a virtual machine, software container, server, and the like.

In an embodiment, the disk 116 is configured to store a log of events. In an embodiment, the disk 116 is configured to store a log of events for the software application 114. In various embodiments, an event stored in the log is an occurrence, action, interaction, which occurs within the software appliance 112, by components of the software appliance 112, or by the software appliance 112 itself. For example, in an embodiment, an event includes the action of a user accessing the software application 114 at a particular time. In an embodiment, an event is an indication of a cybersecurity issue, cybersecurity threat, vulnerability, and the like.

In certain embodiments, the software appliance 112 is configured to utilize the internet 130 for deployment in the cloud computing environment 110. In an embodiment, the software appliance 112 is configured to utilize the internet 130 for connecting to cloud platforms, integrating with cloud services, running configuration scripts, license verification, etc.

In various embodiments, a network log 118 is deployed in the cloud computing environment 110. In some embodiments, the network log is 118 is configured to store a log of events. In an embodiment, the network log 118 is configured to store events related to network traffic, events occurring within the cloud computing environment 110, events between cloud entities of the cloud computing environment, and the like. In various embodiments, events include interactions between the software appliance 112 and other cloud entities deployed in the cloud computing environment 110.

In some embodiments, an event includes an interaction between cloud entities and external devices, systems, principals, environments, the internet 130, and the like. In some embodiments, an event is an indication of a cybersecurity issue, cybersecurity threat, and the like. For example, in an embodiment, the event of an unknown user having two failed login attempts in accessing the software application 114 indicates a cybersecurity issue.

In certain embodiments, an event is stored as an event record. In an embodiment, an event record is a digital record of an event. In an embodiment, an event record includes an event identifier, a timestamp of when the event occurred, the resource that generated the event, information of the principal involved in the event, a combination thereof, and the like. In various embodiments, event records are stored in the network log 118.

In various embodiments, the cloud computing environment 110 is monitored by an inspection environment 120. In some embodiments, the inspection environment 120 includes an inspector 122, an inspection controller 124, a security database 126, a combination thereof, and the like.

In various embodiments, the inspector 122 is configured to inspect the cloud computing environment 110 for software appliances, software applications, and the like. In some embodiments, the inspector 122 is configured to detect software appliances, software applications, and the like, deployed in the cloud computing environment 110. In certain embodiments, the inspector 122 is configured to inspect the network log 118 for events occurring in the cloud computing environment 110.

In some embodiments, an inspectable disk is generated from the disk 116 of the cloud computing environment 110. In certain embodiments, generating the inspectable disk includes generating a snapshot of the disk 116, a clone of the disk 116, a copy of the disk 116, and the like. In some embodiments, the inspectable disk is configured to store the log of events. In an embodiment, the inspector 122 is configured to inspect the log of events stored on the inspectable disk for a cybersecurity issue.

In certain embodiments, the inspection environment 120 further includes an inspection controller 124. In some embodiments, the inspection controller 124 is configured to assign specific inspection tasks to the inspector 122. In various embodiments, the inspection controller 124 is configured to define inspection policies, rules, conditional rules, and the like, for the inspector 122. In an embodiment, the inspection controller 124 is configured to determine which software appliance 112, software application, log, disk, resource, cloud entity, and the like, the inspector 122 should inspect in order to detect cybersecurity issues, cybersecurity events, vulnerabilities, etc.

In certain embodiments, the inspection controller 124 is configured to determine the order of inspection for a software appliance, a software application, a log, a disk, a resource, and the like, that the inspector 122 should inspect.

In an embodiment, the inspection controller 124 is configured to allocate an inspector 122, inspection resources, etc., for inspecting the inspectable disk. In some embodiments, the inspection controller 124 is configured to initiate generation of the inspectable disk. In an embodiment, the inspection controller 124 is configured to generate the inspectable disk from the disk 116 of the software appliance 112 deployed in the cloud computing environment 110. In some embodiments, generating the inspectable disk includes generating a snapshot of the disk 116, a clone of the disk 116, a copy of the disk 116, and the like.

In various embodiments, a security database 126 is configured to store a representation of a cloud computing environment, for example based on a unified data schema. In an embodiment, a unified data schema represents computing resources, entities, and the like, from a first cloud computing platform (e.g., AWS) and a second cloud computing platform (e.g., GCP) utilizing a single data schema.

In an embodiment, a representation of software appliances, software applications, resources, cloud entities, and the like, deployed in the cloud computing environment 110, are stored in the security database 126.

In an embodiment, the security database 126 includes a plurality of databases. In certain embodiments, the security database 126 is implemented as a graph database, tabular database, columnar database, a combination thereof, and the like.

In certain embodiments, the security database 126 is configured to store inspection results, inspection detections, inspection data, etc., generated from the inspector's inspection of the cloud computing environment 110. In some embodiments, the security database 126 is configured to store the log of events of the network log, the log of events of the inspectable disk, the log of events stored on the disk 116 of the software appliance 112.

Figure 2:
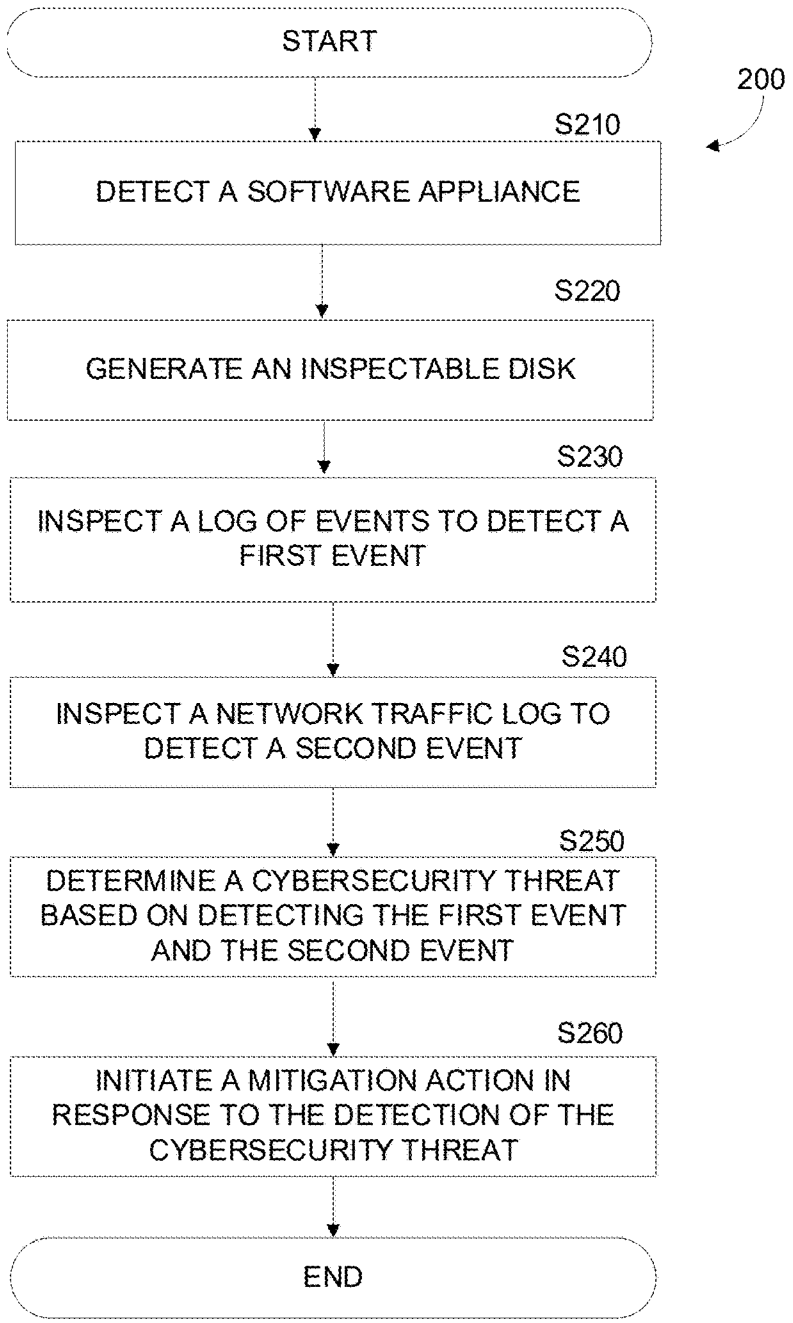
FIG. 2 is an example flowchart of a method for determining a cybersecurity threat based on a first event and a second event, implemented in accordance with an embodiment.

FIG. 2 is an example flowchart 200 of a method for detecting a cybersecurity threat on a software appliance deployed in a cloud computing environment, implemented in accordance with an embodiment. It is advantageous to detect cybersecurity threats based on the detection of a first event and a second event, because the events indicate a potential cybersecurity issue which allows for a more accurate detection of an actual cybersecurity threat. Thus reducing the detection of false positives in cybersecurity threat detection.

At S210, a software appliance is detected. In various embodiments, a software appliance is deployed in the cloud computing environment. In certain embodiments, a plurality of software appliances is deployed in the cloud computing environment. In some embodiments, the software appliance is a pre-configured self-contained software environment.

In an embodiment, the software appliance includes an operating system, a software application, a disk, a combination thereof, and the like. In some embodiments, the software appliance includes an application stored on a disk of the software appliance. In an embodiment, the software appliance includes the necessary dependencies, libraries, and configurations required for the software application to run on the operating system. In certain embodiments, the software appliance is configured to be deployed on a virtual machine, software container, server, and the like.

In various embodiments, an inspector, inspection controller, and the like, is configured to inspect the cloud computing environment to detect a software appliance. In an embodiment, the inspector is configured to inspect a network log which is deployed in the cloud computing environment, in order to detect a software appliance.

In some embodiments the network log is configured to store events. In an embodiment, the events include events related to network traffic, events occurring in the cloud computing environment, events between cloud entities of the cloud computing environment, and the like. In various embodiments, events include interactions between a software appliance and cloud entities, resources, and the like, deployed in the cloud computing environment.

In some embodiments, events include interactions between cloud entities and external environments, external systems, external devices, the internet, a combination thereof, and the like. In an embodiment, an event includes an interaction between a cloud entity, a principal, user, and the like. In certain embodiments, an event is an event record. In an embodiment, an event record is a digital record of an event.

In an embodiment, an event record includes an event identifier, a timestamp of when the event occurred, the resource that generated the event, information of the principal involved in the event, a combination thereof, and the like. In various embodiments, event records are stored in the network log. In some embodiments, the inspector is configured to inspect the events, event records, and the like, stored in the network log in order to detect a software appliance.

In certain embodiments, the inspector is configured to filter the events, event records, and the like, for detecting an identifier of a software appliance, an identifier of a software application, and the like. In an embodiment, the filtering of event records stored in the network log occurs in order to detect an identifier of a software appliance. In an embodiment, event records stored in the network log are filtered for the detection of event records including an identifier of a software appliance. In various embodiments, an identifier of the software appliance is an indication of a software appliance deployed in the cloud computing environment. In certain embodiments, an identifier of a software application is an indication of an actual software appliance deployed in the cloud computing environment. In some embodiments, filtering an event record is performed based on a data field of the event record.

At S220, an inspectable disk is generated. In an embodiment, the inspectable disk is generated based on a disk deployed on a software appliance in the cloud computing environment. In an embodiment, the inspectable disk is generated from a virtual disk, virtual storage device, virtual disk file, and the like. In some embodiments, generating the inspectable disk includes generating a snapshot of the disk, a clone of the disk, a copy of the disk, and the like.

In various embodiments, the disk stores a log of events. In an embodiment, the disk stores a log of events for the application of the software appliance. In an embodiment, the inspectable disk is configured to also store a log of events based on the disk. In various embodiments, an event stored in the log of events is an occurrence, action, interaction, which occurs within the software appliance, by components of the software appliance, or interactions of the software application with other cloud entities, resources, and the like.

In an embodiment, the inspectable disk stores a log of events, including events that indicate a cybersecurity issue, cybersecurity threat, and the like. For example, in an embodiment, an event such as a user login of the software application from an unknown Internet Protocol (IP) address, is an event that indicates a potential cybersecurity issue.

According to an embodiment, a software appliance is an immutable image, and a sensor, agent, and the like, cannot be installed thereon. In such embodiments, generating an inspectable disk is advantageous as it allows inspection of a software appliance for cybersecurity issues such as misconfigurations, vulnerabilities, malware, cybersecurity objects, a combination thereof, and the like.

At S230, a log of events is inspected to detect a first event. In an embodiment, the log of events on the inspectable disk is inspected to detect a first event indicating a cybersecurity issue. In some embodiments, the software appliance is configured to generate the log of events, for example in response to a request, configuration setting, and the like, initiated by an inspection environment.

In various embodiments, an inspector is configured to inspect the log of events, including events, event records, and the like, for events indicating a cybersecurity issue. For example, in an embodiment, events indicating a cybersecurity issue include multiple failed login attempts, login attempts from an unusual location, the execution of an unauthorized software application, execution of an unknown software program, etc.

In some embodiments, the inspector is configured to inspect the event records for an indication of a cybersecurity issue. In an embodiment, the inspector is configured to inspect the event records for a first event indicating a cybersecurity issue. In an embodiment, the inspector is configured to inspect components of the event records to detect a first event, indicating a cybersecurity issue. In some embodiments, components of an event record such as an event identifier, a timestamp of when the event occurred, the resource that generated the event, information of the principal involved in the event, a combination thereof, and the like, indicate a cybersecurity issue.

For example, in an embodiment the inspector is configured to inspect the event records for a first event identifier, "unknown_software_installation", indicating a cybersecurity issue. In some embodiments, the inspector is configured to detect a first event, first event record, and the like, indicating a cybersecurity issue from the log of events, event records, and the like, from the inspectable disk. In certain embodiments, inspecting an event record includes inspecting, detecting, parsing, etc., data fields of a data record to detect values of the data fields.

In an embodiment, an inspector is configured to inspect the inspectable disk for a cybersecurity object which indicates a cybersecurity issue, cybersecurity threat, a data breach, a vulnerability, a combination thereof, and the like. For example, in an embodiment, a cybersecurity object is a password, a certificate, a cryptographic key, a software, an application, a library, a binary, a configuration file, a filesystem, a combination thereof, and the like.

At S240, a network log is inspected. In an embodiment, the network log of the cloud computing environment is inspected to detect a second event in the cloud computing environment.

In various embodiments, the network log is deployed in the cloud computing environment. In some embodiments, the network log is configured to store a log of events including the second event. In an embodiment, the network log is configured to store events related to network traffic, events occurring within the cloud computing environment, events between cloud entities of the cloud computing environment, and the like. In various embodiments, events include interactions between a software appliance and cloud entities deployed in the cloud computing environment. In some embodiments, an event includes an interaction between cloud entities and external devices, systems, principals, environments, the internet, and the like. In an embodiment, a log of a software appliance includes internal events (e.g., events initiated by/on the software appliance), external events (e.g., events where the software appliance interacts with resources, principals, and the like which are not the software appliance), a combination thereof, and the like. In some embodiments, the network log includes events which are external to the software appliance, and does not include events which are internal.

In various embodiments, the inspector is configured to inspect the network log for events, event records, the second event, and the like. In some embodiments, the inspector is configured to inspect the event records to detect the second event. In an embodiment, the second event is an indication of a cybersecurity issue. In some embodiments, the second event is associated with the first event.

In an embodiment, the inspector is configured to inspect components of the event records to detect the second event, indicating a cybersecurity issue. In some embodiments, components of the event record such as an event identifier, a timestamp of when the event occurred, the resource that generated the event, information of the principal involved in the event, a combination thereof, and the like, indicate a cybersecurity issue.

For example, in an embodiment the inspector is configured to inspect the event records for the detection of the second event identifier of, "two_failed_login_attempts", indicating a cybersecurity issue.

At S250, a cybersecurity threat is detected. In an embodiment, the cybersecurity threat is detected based on the detection of the first event and the second event. In some embodiments, the first event and the second event are associated, for example, as happening within a predefined amount of time of each other. In some embodiments, the second event is sequential, consequential, and the like, to the first event.

In certain embodiments, the first event and the second event are associated with a common resource, cloud entity, deployed in the cloud computing environment. In an embodiment, the cybersecurity threat is detected based on the first event and second event. For example, in an embodiment, a cybersecurity threat is detected based on the first event of a user gaining unauthorized access to a software appliance, and the second event of a malicious file being installed on the software appliance. In some embodiments, the cybersecurity threat is detected based on a combination of the events, also known as a toxic combination. In an embodiment, the events, together with a detected cybersecurity object, indicate the cybersecurity threat.

In an embodiment, a cybersecurity object is a password stored as text, a cryptographic key, a certificate, a secret, a cloud key, a binary, a library, a software application, an operating system, a combination thereof, and the like. In an embodiment, the cybersecurity issue is a configuration. In certain embodiments, the cybersecurity threat is a cybersecurity risk, a vulnerability, an exposure, a misconfiguration, a combination thereof, and the like.

At S260, a mitigation action is initiated. In various embodiments, a mitigation action is initiated based on the detection of the cybersecurity threat.

In various embodiments, the mitigation action includes isolating a software appliance, blocking access to a software appliance, implementing a firewall policy, suspending a user account, suspending access to a resource, generating an alert, implementing a software patch, a combination thereof, and the like.

In certain embodiments, the mitigation action is generated based on the first event and second event. For example, in an embodiment, the mitigation action of blocking user access to a software appliance is implemented in response to the first event of a failed user login attempt to the software appliance, and the second event of a privilege escalation or the user.

Figure 3:
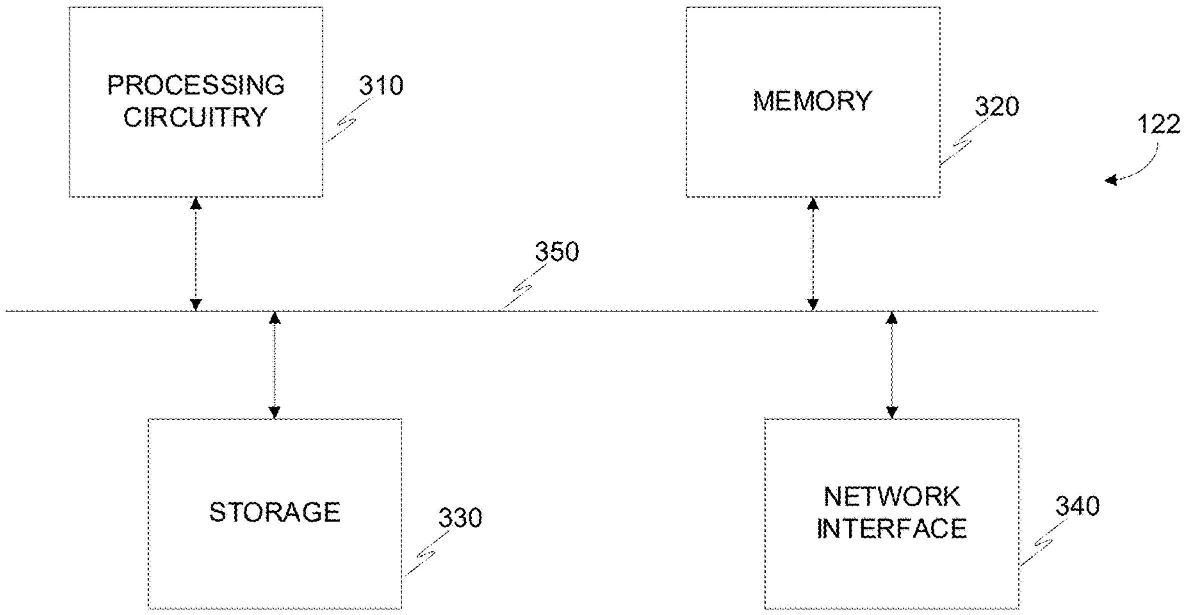
FIG. 3 is an example schematic diagram of an inspector, implemented in accordance with an embodiment.

FIG. 3 is an example schematic diagram of an inspector 122, according to an embodiment. The inspector 122 includes a processing circuitry 310 coupled to a memory 320, a storage 330, and a network interface 340. In an embodiment, the components of the inspector 122 may be communicatively connected via a bus 350.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., random access memory, etc.), non-volatile (e.g., read only memory, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 330 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 340 allows the inspector 122 to communicate with, for example, an inspection controller 124, a security database 126, and the like.

It should be understood that the embodiments described herein are not limited to the specific architecture illustrated in FIG. 3, and other architectures may be equally used without departing from the scope of the disclosed embodiments.

Furthermore, in certain embodiments the inspector 122, the inspection controller 124, and the like, may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for agentless endpoint detection and response for software appliances deployed in a cloud computing environment, comprising:

detecting a software appliance deployed in a cloud computing environment, the software appliance including an application stored on a disk of the software appliance;

generating an inspectable disk based on a clone of the disk, wherein the disk stores a log of events for the application;

inspecting the log of events stored on the inspectable disk to detect a first event indicating a cybersecurity issue;

inspecting a network log of the cloud computing environment to detect a second event in the cloud computing environment;

determining a cybersecurity threat based on detecting the first event and the second event; and initiating a mitigation action in response to the detection of the cybersecurity threat.

2. The method of claim 1, wherein detecting a software appliance deployed in a cloud computing environment further comprises:

inspecting event records stored in the network log to detect the software appliance.

3. The method of claim 2, wherein detecting a software appliance deployed in the cloud computing environment further comprises:

filtering the event records stored in the network log to detect an identifier of a software appliance.

4. The method of claim 1, wherein generating an inspectable disk based on the disk, further comprises:

generating the inspectable disk based on a snapshot of the disk.

5. The method of claim 1, wherein inspecting the log of events stored on the inspectable disk further comprises:

inspecting data fields of event records to detect the first event, wherein the first event is of a first type.

6. The method of claim 1, further comprising:

inspecting the inspectable disk for a cybersecurity object, wherein the cybersecurity object indicates the cybersecurity issue.

7. The method of claim 1, wherein inspecting a network log further comprises:

inspecting data fields of event records stored in the network log for detection of the second event.

8. The method of claim 1, wherein initiating a mitigation action further comprises:

initiating the mitigation action on the software appliance.

9. A non-transitory computer-readable medium storing a set of instructions for agentless endpoint detection and response for software appliances deployed in a cloud computing environment, the set of instructions comprising:

one or more instructions that, when executed by one or more processing circuitries of a device, cause the device to:

detect a software appliance deployed in a cloud computing environment, the software appliance including an application stored on a disk of the software appliance;

generate an inspectable disk based on a clone of the disk, wherein the disk stores a log of events for the application;

inspect the log of events stored on the inspectable disk to detect a first event indicating a cybersecurity issue inspect a network log of the cloud computing environment to detect a second event in the cloud computing environment determine a cybersecurity threat based on detecting the first event and the second event; and initiate a mitigation action in response to the detection of the cybersecurity threat.

10. A system for agentless endpoint detection and response for software appliances deployed in a cloud computing environment comprising:

a processing circuitry;

a memory, the memory containing instructions that, when executed by the processing circuitry, configure the system to:

detect a software appliance deployed in a cloud computing environment, the software appliance including an application stored on a disk of the software appliance;

generate an inspectable disk based on a clone of the disk, wherein the disk stores a log of events for the application;

inspect the log of events stored on the inspectable disk to detect a first event indicating a cybersecurity issue inspect a network log of the cloud computing environment to detect a second event in the cloud computing environment determine a cybersecurity threat based on detecting the first event and the second event; and initiate a mitigation action in response to the detection of the cybersecurity threat.

11. The system of claim 10, wherein the memory contains further instructions that, when executed by the processing circuitry for detecting a software appliance deployed in a cloud computing environment, further configure the system to:

inspect event records stored in the network log to detect the software appliance.

12. The system of claim 11, wherein the memory contains further instructions that, when executed by the processing circuitry for detecting a software appliance deployed in the cloud computing environment, further configure the system to:

filter the event records stored in the network log to detect an identifier of a software appliance.

13. The system of claim 10, wherein the memory contains further instructions that, when executed by the processing circuitry for generating an inspectable disk based on the disk, further configure the system to:

generate the inspectable disk based on a snapshot of the disk.

14. The system of claim 10, wherein the memory contains further instructions that, when executed by the processing circuitry for inspecting the log of events stored on the inspectable disk, further configure the system to:

inspect data fields of event records to detect the first event, wherein the first event is of a first type.

15. The system of claim 10, wherein the memory contains further instructions which when executed by the processing circuitry further configure the system to:

inspect the inspectable disk for a cybersecurity object, wherein the cybersecurity object indicates the cybersecurity issue.

16. The system of claim 10, wherein the memory contains further instructions that, when executed by the processing circuitry for inspecting a network log, further configure the system to:

inspect data fields of event records stored in the network log for detection of the second event.

17. The system of claim 10, wherein the memory contains further instructions that, when executed by the processing circuitry for initiating a mitigation action, further configure the system to:

initiate the mitigation action on the software appliance.

* * * * *